United States Patent
Chang et al.

(10) Patent No.: US 10,338,978 B2
(45) Date of Patent: Jul. 2, 2019

(54) ELECTRONIC DEVICE TEST SYSTEM AND METHOD THEREOF

(71) Applicant: PRIMAX ELECTRONICS LTD., Taipei (TW)

(72) Inventors: Pei-Ming Chang, Taipei (TW); Shih-Chieh Hsu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 161 days.

(21) Appl. No.: 15/493,856

(22) Filed: Apr. 21, 2017

(65) Prior Publication Data
US 2018/0150340 A1    May 31, 2018

(30) Foreign Application Priority Data
Nov. 25, 2016   (TW) .............................. 105138915 A

(51) Int. Cl.
G06F 3/00   (2006.01)
G06F 9/54   (2006.01)
G06F 11/10  (2006.01)

(52) U.S. Cl.
CPC .............. *G06F 9/546* (2013.01); *G06F 9/542* (2013.01); *G06F 11/1004* (2013.01)

(58) Field of Classification Search
CPC ....................................................... G06F 9/54
USPC ........................................................ 719/310
See application file for complete search history.

(56) References Cited

U.S. PATENT DOCUMENTS

| 3,469,244 A * | 9/1969 | Perotto ................. G06F 3/0227 713/500 |
| 2008/0150985 A1* | 6/2008 | Ikemoto ................. B41J 3/4071 347/11 |
| 2008/0228850 A1* | 9/2008 | Samuels ................. H04L 69/04 709/201 |
| 2010/0029247 A1* | 2/2010 | De Atley .............. H04W 8/265 455/411 |
| 2011/0138295 A1* | 6/2011 | Momchilov .......... G06F 3/0484 715/740 |

OTHER PUBLICATIONS

E. Seto, Quantifying Head Motion Associated with Motor Tasks Used in fMRI, (Year: 2001).*

* cited by examiner

*Primary Examiner* — Lechi Truong
(74) *Attorney, Agent, or Firm* — Kirton McConkie; Evan R. Witt

(57) ABSTRACT

An electronic device test system and method detects a memory serial number of an electronic device. The electronic device test system includes a Macintosh system computer, configured to execute a serial number detection program to detect the memory serial number of the electronic device; and a Windows system computer, configured to execute a serial number comparison program to compare whether the memory serial number of the electronic device satisfies a coding rule. The Macintosh system computer transmits the memory serial number to the Windows system computer by means of an RS232 interface for printing.

2 Claims, 2 Drawing Sheets

ELECTRONIC DEVICE TEST SYSTEM AND METHOD THEREOF

FIELD OF THE INVENTION

The present invention relates to the application field of testing a computer and peripheral devices thereof, and in particular, to a system of a test station of a production line of a computer and peripheral devices thereof and a method therefor.

BACKGROUND OF THE INVENTION

An operating system (Operating system, OS) is a computer program that manages hardware and software resources of a computer, is configured to do basic affairs of computer operation, for example, manage and configure file storage, determine a priority of overall system resource allocation, control an input and output device, operate a network, and manage a file system, and at the same time, provides an operating interface to facilitate a user to operate a computer system.

A Windows (Windows) system and a Macintosh (Macintosh) system are two mainstream computer operating systems in the current world. Generally, because the Windows system has good word processing capability, general companies or manufacturing factories of electronic devices mostly use the Windows system. However, because the Macintosh system has good image processing capability, customer groups that use the Macintosh system are mostly involved in advertisement or design industries.

Because current production lines of factories that manufacture computers and computer peripheral devices mostly use the Windows system, when the production lines are used to produce and manufacture computers and peripheral devices thereof that belong to the Windows system, a problem of incompatibility between systems or programs does not easily occur because the systems are the same. However, when the production lines are used to produce and manufacture computers and peripheral devices thereof that belong to the Macintosh system, a problem of incompatibility between systems or programs easily occurs because the systems are different. To solve the problem of compatibility between systems or programs, when a production line is used to produce and manufacture computers and peripheral devices thereof that belong to the Macintosh system, each test station on the production line needs to replace an original computer with a Macintosh system computer, to facilitate testing whether a circuit board or a memory in a Macintosh system computer and peripheral devices thereof can normally operate, and also perform detection to obtain product serial numbers in the circuit board or memory.

After the test is completed, the Macintosh system computer then transmits data, for example, the product serial numbers in the circuit board or memory to an external Windows system computer by means of a wired/wireless network, and then prints the product serial numbers in the circuit board or memory into bar code labels by means of the Windows system computer. However, because delay easily occurs when the data, for example, the product serial numbers, is transmitted by means of the wired/wireless network, and consequently, the printed bar code labels are not attached to correct electronic products or outer packages thereof.

In view of the above, providing a transmission interface compatible with the Windows system and the Macintosh system and avoiding delay during data transmission are technical problems to be solved by the present invention.

SUMMARY OF THE INVENTION

A main objective of the present invention lies in providing an electronic device test system, so as to effectively reduce delay and errors of data transmission on a production line, thereby improving operating efficiency of the production line.

To achieve the foregoing objective, the present invention provides an electronic device test system, configured to detect a memory serial number of an electronic device, where the electronic device test system includes:

a Macintosh system computer, configured to execute a serial number detection program to detect the memory serial number of the electronic device; and a Windows system computer, configured to execute a serial number comparison program to compare whether the memory serial number of the electronic device satisfies a coding rule, where the Macintosh system computer transmits the memory serial number to the Windows system computer by means of an RS232 interface.

In the foregoing preferred implementation manner, the electronic device test system includes a printer, which is configured to print the memory serial number.

In the foregoing preferred implementation manner, the serial number comparison program further executes an analog keyboard event to drive the printer to print the memory serial number.

In the foregoing preferred implementation manner, the analog keyboard event uses a sendkey function or a keyevent function.

In the foregoing preferred implementation manner, the electronic device is: a mouse, a touchpad, a notebook computer, a tablet computer, a mobile phone, a watch, or a multimedia player.

Another preferred practice of the present invention relates to an electronic device test method, used to detect a memory serial number of an electronic device, where the electronic device test method includes the following steps:

(a). detecting the memory serial number of the electronic device;

(b). transmitting the memory serial number to a Windows system computer by means of an RS232 interface;

(c). comparing whether the memory serial number satisfies a coding rule; if the memory serial number does not satisfy the coding rule, generating an alarm message, and if the memory serial number satisfies the coding rule, performing a next step;

(d). executing an analog keyboard event to input the memory serial number; and (e). printing the memory serial number.

In the foregoing preferred implementation manner, in step (d), the analog keyboard event uses a sendkey function or a keyevent function.

DETAILED DESCRIPTION OF THE PREFERRED EMBODIMENT

Advantages and features of the present invention and a method for implementing same will be described in a more detailed way with reference to exemplary embodiments and the accompanying drawings for easier understanding. However, the present invention may be implemented in different forms and should not be understood to be limited only to the embodiments stated herein. On the contrary, for a person of ordinary skill in the art, the provided embodiments will make the present disclosure more thorough and more comprehensive and completely convey the scope of the present invention.

Figure 1:
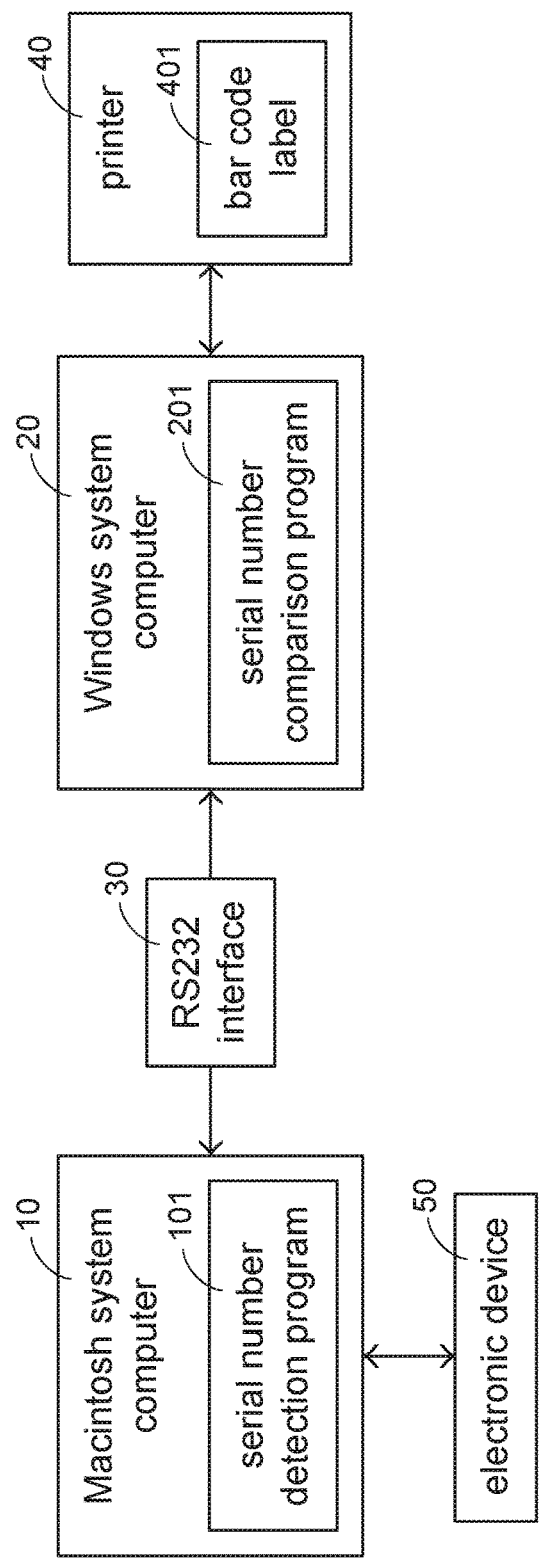
FIG. 1 is an electronic device test system according to the present invention.

First, referring to FIG. 1, FIG. 1 is an electronic device test system according to the present invention, wherein the electronic device belongs to a Macintosh system. In a preferred implementation manner of the present invention, the electronic device test system includes: a Macintosh system computer 10, a Windows system computer 20, an RS232 (Recommend Standard number 232) interface 30, a printer 40, and an electronic device 50. The Macintosh system computer 10 is configured to install and execute a serial number detection program 101, which is written by using an Objective-C language. The Windows system computer 20 is configured to install and execute a serial number comparison program 201. The serial number comparison program 201 is an RS232 receiving end program, and is written by using a C language. In addition, the serial number detection program 101 is configured to detect the electronic device 50 electrically connected to the Macintosh system computer 10, so as to obtain a memory serial number (Serial Number, SN) of the electronic device 50, and transmit the obtained memory serial number of the electronic device 50 to the Windows system computer 20 by means of the RS232 interface.

After receiving data of the memory serial number of the electronic device 50, the Windows system computer 20 compares, by using the serial number comparison program 201, whether the memory serial number of the electronic device 50 satisfies a coding rule. The coding rule includes: (1). serial number regular length check: detecting whether a length of the serial number satisfies a preset length, for example, a total length of a serial number: CC255120P67GRHQA5 is 17 bits; (2). Check sum: operating, by using a predefined math formula, the data of the memory serial number into a check code; if a result of the check code is 0, it indicates that the data of the memory serial number is correct; and if the result of the check code is not 0, it indicates that errors occur in a process of transmitting the data of the memory serial number; and (3). Vender ID check: checking whether a particular bit of the serial number is consistent with a provided vender number, for example, checking whether a third bit of the serial number is consistent with a code of a battery vender.

After the comparison of the memory serial number of the electronic device 50 is completed, the serial number comparison program 201 further executes an analog keyboard event, and inputs the memory serial number of the electronic device 50 by means of an action of simulating a key input of the analog keyboard event, and after the input is completed, the serial number comparison program 201 then drives the printer 40 to print a bar code label 401 that includes the memory serial number of the electronic device 50. Finally, the bar code label 401 is adhered to a housing (not shown in the drawings) or an outer package (not shown in the drawings) of the electronic device 50 in a manual or mechanical manner. The electronic device 50 of the present invention may be a mouse, a touchpad, a notebook computer, a tablet computer, a mobile phone, a watch, or a multimedia player.

Figure 2:
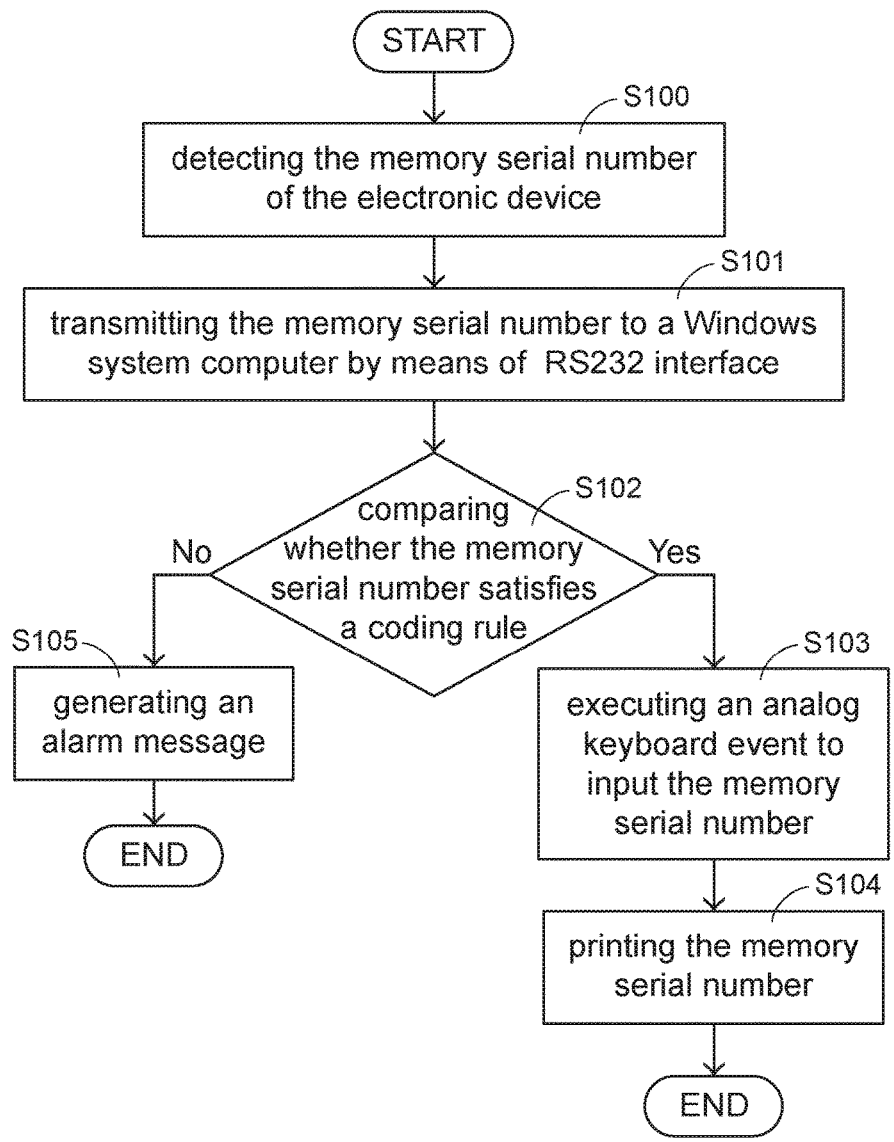
FIG. 2 is a test flowchart of the electronic device test system of the present invention.

Referring to FIG. 1 and FIG. 2 together, FIG. 2 is a test flowchart of the electronic device test system of the present invention. In a process in which a production line produces and manufactures an electronic device, first, the memory serial number of the electronic device 50 is detected by using the serial number detection program 101 in the Macintosh system computer 10 (step S100); in step S100, the serial number detection program 101 sends a serial number requirement to the electronic device 50; after receiving the serial number requirement, the electronic device 50 feeds back the memory serial number thereof to the serial number detection program 101, and then the memory serial number is transmitted to the Windows system computer 20 by means of the RS232 interface 30 (step S101); in step S101, because the RS232 interface 30 is in a form of an interface for serial data transmission, and the data of the memory serial number is transmitted to the Windows system computer 20 in a manner of one bit (Binary digit, Bit) following another, delay does not occur during data transmission.

Subsequently, the serial number comparison program 201 in the Windows system computer 20 compares whether the memory serial number satisfies the coding rule (step S102); in step S102, the coding rule includes: (1). serial number regular length check; (2). Check Sum; and (3). Vender ID check; next, if a comparison result displays that the memory serial number does not satisfy the coding rule, then an alarm message is generated (step S105); in step S105, the alarm message is used to notify/warn an operator of the production line or a production line system that delay or errors occur to transmission of the data of the memory serial number, and it is required to return to step S100 for detection of the memory serial number; if the comparison result displays that the memory serial number satisfies the coding rule, the analog keyboard event is executed to input the memory serial number (step S103); in step S103, the analog keyboard event uses a sendkey function or a keyevent function, and the memory serial number of the electronic device 50 is input by means of an action of simulating a key input of the analog keyboard event; subsequently, the printer 40 is driven to print the memory serial number (step S104); in step S104, the printer 40 prints the bar code label 401 that includes the memory serial number of the electronic device 50; finally, the bar code label 401 may be adhered to the housing (not shown in the drawings) or the outer package (not shown in the drawings) of the electronic device 50 in a manual or mechanical manner.

Although the present invention provides an implementation manner of detection of only a memory serial number of an electronic device, the present invention is not limited thereto. Actually, the electronic device test system according to the present invention can be applied to detection of serial numbers of various parts in an electronic device, for example, the electronic device test system can detect product serial numbers of a screen, a circuit board, or an electric energy storage device, but is not limited to the detection of the memory serial number.

Compared with the prior art, the present invention replaces a wired/wireless network with an RS232 interface to perform data transmission, so as to avoid errors or delay generated during data transmission, thereby effectively improving operating efficiency of a production line of an electronic device. Therefore, the present invention is actually of great industrial value.

Various modifications are made to the present invention by a person skilled in the art, but the protection scope of the present invention is subject to the appended claims.

What is claimed is:

1. A method for testing a Macintosh compliant electronic device and labeling the electric device through a Windows system computer, used to detect a memory serial number of the Macintosh compliant electronic device and using the Windows system to generate a bar code label corresponding to the memory serial number, the method comprising the following steps:
   (a) using a Macintosh computer to detect the memory serial number of the Macintosh compliant electronic device;
   (b) using the Macintosh computer to transmit the memory serial number to the Windows system computer by means of an RS232 interface;
   (c) using the Windows system computer to compare whether the memory serial number satisfies a coding rule; if the memory serial number does not satisfy the coding rule, the Windows system computer generates an alarm message, and if the memory serial number satisfies the coding rule, the Windows system computer performs the next steps (d) and (e):
   (d) executing an analog keyboard event to input the memory serial number; and
   (e) driving a printer to print a bar code label that includes the memory serial number of the Macintosh compliant electronic device; and
   (f) adhering the bar code label to the Macintosh compliant electronic device.

2. The method according to claim 1, wherein in step (d), the analog keyboard event uses a sendkey function or a keyevent function.

\* \* \* \* \*